*(12)* United States Patent
Sturt et al.

(10) Patent No.: US 7,052,068 B2
(45) Date of Patent: May 30, 2006

(54) CONFIGURABLE OVERHEAD CONSOLE

(75) Inventors: Alan Sturt, West Bloomfield, MI (US); Andrew Marc Stein, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/711,760

(22) Filed: Oct. 4, 2004

(65) Prior Publication Data

US 2006/0071496 A1    Apr. 6, 2006

(51) Int. Cl.
    *B60R 11/00*  (2006.01)
(52) U.S. Cl. .................. 296/37.7; 296/24.34; 224/311
(58) Field of Classification Search ............. 296/37.7, 296/37.8, 214, 24.34; 224/311
    See application file for complete search history.

(56) References Cited

U.S. PATENT DOCUMENTS

| | | | | |
|---|---|---|---|---|
| 4,783,110 A | * | 11/1988 | Beukema et al. | .......... 296/37.7 |
| 4,844,533 A | * | 7/1989 | Dowd et al. | ................. 296/214 |
| 4,981,323 A | * | 1/1991 | Dowd et al. | ................. 296/214 |
| 5,636,891 A | * | 6/1997 | Van Order et al. | ........ 296/37.7 |
| 5,795,015 A | | 8/1998 | Corpe et al. | |
| 6,070,902 A | | 6/2000 | Kowalski et al. | |
| 6,176,536 B1 | * | 1/2001 | Miller et al. | ................ 296/37.7 |
| 6,338,517 B1 | | 1/2002 | Canni et al. | |
| 6,575,528 B1 | * | 6/2003 | Tiesler et al. | ................ 296/214 |
| 6,619,716 B1 | * | 9/2003 | Sturt | ......................... 296/37.8 |
| 6,824,185 B1 | * | 11/2004 | Tiesler et al. | .............. 296/37.8 |
| 2001/0005083 A1 | * | 6/2001 | Serizawa et al. | .......... 296/37.8 |
| 2002/0163219 A1 | | 11/2002 | Clark et al. | |

FOREIGN PATENT DOCUMENTS

JP        2003-237477        *  8/2003

* cited by examiner

*Primary Examiner*—Dennis H. Pedder
(74) *Attorney, Agent, or Firm*—Bir Law, PLC; David S. Bir

(57) ABSTRACT

A configurable overhead console includes a support beam concealed above a headliner with a plurality of apertures adapted to receive one or more removable modules positioned below the headliner and sufficiently spaced to inhibit folding or creasing of the headliner during handling. The support beam may include attachment apertures and one or more associated positioning or orientation apertures to orient and secure a removable module to the support beam via a twist-lock latching device. Electrical contact strips may be provided along one or more of the channels of the support beam to provide power to modules via corresponding contact pins that extend through the attachment aperture and/or alignment or positioning apertures.

17 Claims, 2 Drawing Sheets

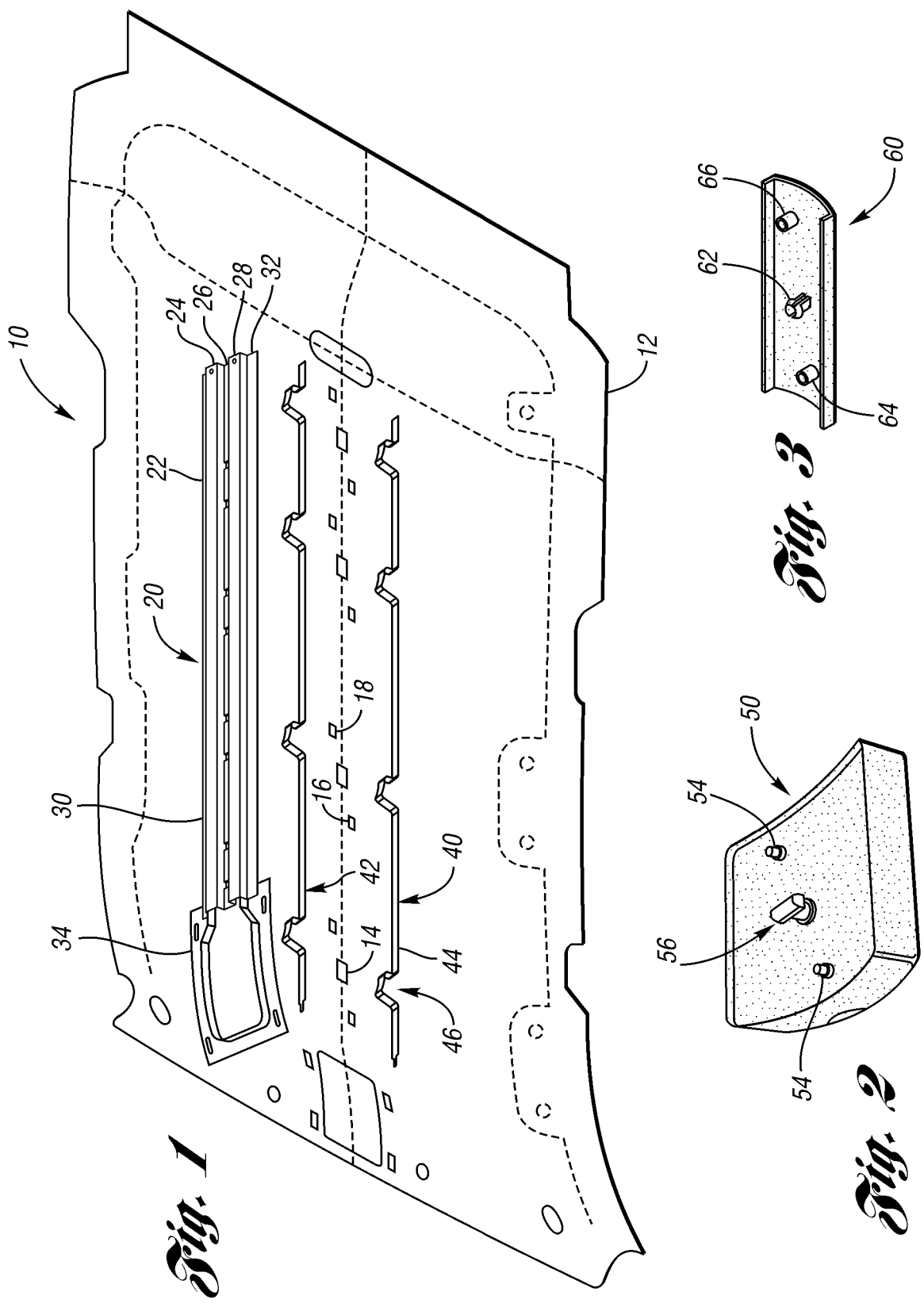

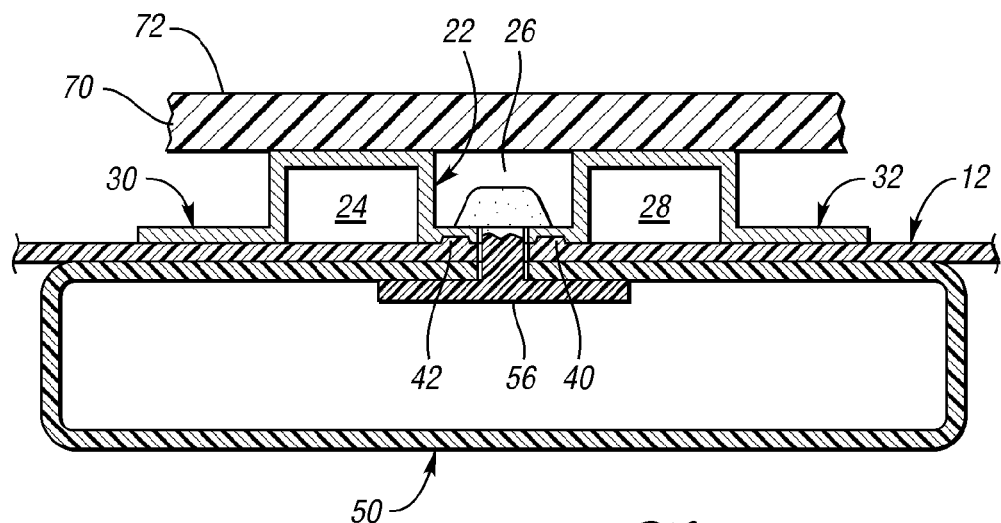
Fig. 4
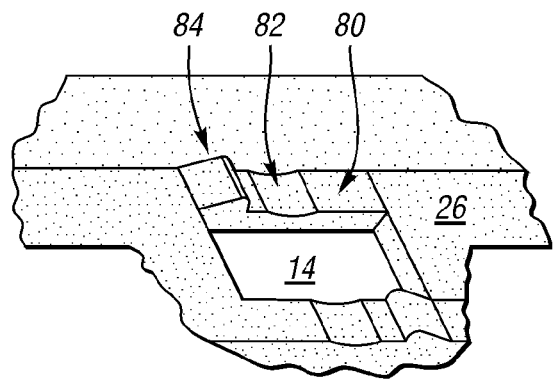
Fig. 5
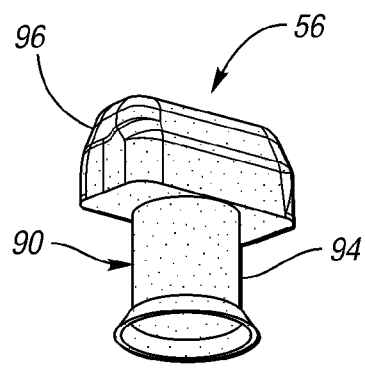
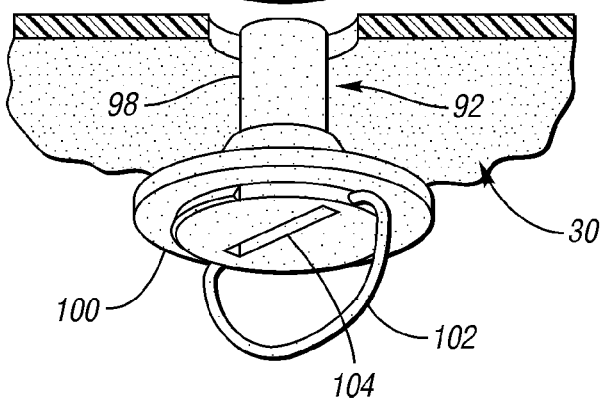
Fig. 6

CONFIGURABLE OVERHEAD CONSOLE

FIELD OF THE INVENTION

The present invention relates to configurable overhead consoles for a vehicle.

BACKGROUND ART

Consumers continue to prefer maximum flexibility in configuring a vehicle interior to accommodate varying types of cargo having different shapes and sizes. Overhead consoles are often included in the interior of vehicles, such as automobiles, trucks, airplanes, and marine vehicles, to provide convenient storage and/or access to vehicle or accessory controls. For example, an overhead console may include various general or specialized compartments for storing items, control panels for operating accessories such as interior or exterior vehicle lights, audio/video equipment, garage door openers, etc.

Various types of configurable overhead consoles have been developed that allow modules to be positioned along one or more tracks that extend between forward and rearward portions of the vehicle interior. One type of modular overhead console system, disclosed in U.S. Patent Application Publication 2002/0163219 for example, uses dual tracks, bars, or rods that receive removable modules. These systems have tracks that are visible to the occupants and reduce headroom even when one of the removable modules is not present. Because the tracks are visible, they can be more expensive to produce and may be limited to aesthetically pleasing materials. Another modular overhead console assembly, as disclosed in U.S. Pat. No. 6,575,528 includes a hidden structural member or track that receives removable modules. This type of arrangement has an elongated slot in the headliner to position the modules along the track. The elongated slot poses challenges in handling and transporting the headliner to avoid folding or creasing before the structural member has been secured to the headliner.

SUMMARY OF THE INVENTION

The present invention includes a configurable overhead console having a support member concealed above a headliner with a plurality of apertures adapted to receive one or more removable modules positioned below the headliner.

Embodiments of the invention include a configurable overhead console having a support beam substantially concealed from view with three channels extending longitudinally above a headliner with the center channel including a plurality of attachment apertures spaced along the support beam, each attachment aperture including one or more locating or positioning apertures to rotationally position or orient modules during removable or permanent attachment to the support beam. Modules may be attached using a single quarter-turn latch that engages at least one of the attachment apertures. Other methods of attachment may also be employed including commercially available fasteners and latch devices. Electrical contact strips may be provided along one or more of the channels of the support beam to provide power to modules via corresponding contact pins that extend through the attachment aperture and/or alignment or positioning apertures.

The present invention provides a number of advantages. For example, the present invention maintains the integrity of the headliner by including attachment apertures rather than an elongated slot so the headliner is easier to handle and transport prior to attachment of the structural member. The attachment and alignment apertures orient and hold each module in a fixed position to prevent sliding during sudden stops. The present invention includes a headliner and module support structure that is positioned above the headliner so it is hidden from view and does not reduce head clearance. Because the structural support is substantially concealed, the material selection and construction techniques of the support members may be designed for strength and functionality without regard to aesthetic characteristics. Removable modules may be independently attached to the support structure without tools using a single latch mechanism with blank plates provided for each module area when a space is not occupied by a module.

The above advantages and other advantages and features of the present invention will be readily apparent from the following detailed description of the preferred embodiments when taken in connection with the accompanying drawings.

BRIEF DESCRIPTION OF THE DRAWINGS

FIGS. 1–3 are perspective views of representative components of a configurable overhead console according to one embodiment of the present invention;

FIG. 4 is a cross-sectional view of a representative overhead console module secured to a hidden structural member according to one embodiment of the present invention;

FIG. 5 is a cut-away view illustrating details of a latching area of a structural member in a configurable overhead console according to one embodiment of the present invention; and FIG. 6 is a perspective view of a representative two-part securing device for a module of a configurable overhead console according to embodiments of the present invention.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. Likewise, features illustrated and described in a particular combination are not necessarily required to be used in combination, but may be used individually. The combinations of features illustrated provide representative embodiments for typical applications. However, various combinations and modifications of the features consistent with the teachings of the present invention may be desired for particular applications or implementations.

Referring now to FIGS. 1–3, perspective views of representative components used in a configurable overhead console according to the present invention are shown. System 10 is shown unassembled to illustrate various features of the individual components including a vehicle headliner 12 having a plurality of overhead console module attachment apertures 14 each with at least one associated positioning or alignment hole 16, 18. In one embodiment, headliner 12 includes two alignment holes 16, 18 diagonally positioned relative to a corresponding attachment hole 14. The number of attachment holes 14 and alignment or orientation holes 16, 18 may vary depending upon the particular application and implementation. For example, some module positions may include fewer/additional alignment holes or alignment holes arranged in a particular pattern so that only modules compatible to a particular space may be installed, e.g. the alignment hole pattern may prevent video modules from being installed near the vehicle operator, etc. According to the present invention, attachment apertures 14 are sized and spaced sufficiently along a central axis of headliner 12 to inhibit folding or creasing of headliner 12 along its central axis. The spacing and size of attachment holes 14 may vary depending upon the particular material and design of headliner 12 but the space between adjacent attachment holes is typically several times the length of any one of the attachment holes to provide sufficient support to inhibit folding or creasing along the central axis. The present invention recognizes that the use of appropriately sized and spaced attachment apertures rather than an elongated slot reduces the likelihood of a fold or crease along the central longitudinal axis during handling.

System 10 includes a support structure 20 having a support member or beam 22. In the illustrated embodiment, support member 22 includes channels 24, 26, 28 positioned between outboard flanges 30, 32 that are used to secure support member 22 to headliner 12 and the interior roof bow of the roof panel of a vehicle (best illustrated in FIG. 4). Support structure 20 also includes a front console retainer 34 secured to support beam 22 by any appropriate method such as spot welding (for steel), vibration welding, or heat staking (for plastic), etc. Alternatively, support beam 22 and front console retainer 34 may be integrally formed in a unitary construction. Center channel 26 of support beam 22 includes a plurality of attachment holes each with one or more associated alignment or positioning holes that are aligned with corresponding alignment holes 14 and positioning holes 16, 18 in headliner 12 during assembly. Support structure 20 may be secured to headliner 12 and the interior roof bow of a vehicle using any of a number of known methods as described in greater detail with reference to FIG. 4.

As also shown in FIGS. 1–3, system 10 may include electrical conductors 40, 42 to distribute power to one or more installed modules, such as module 50. Electrical conductors 40, 42 may extend the entire length of support beam 22, or may be limited to a particular section or area depending upon the particular application. In the illustrated embodiment, conductors 40, 42 include flat sections 44 extending between raised portions 46 that are aligned with positioning holes 16 between center channel 26 and headliner 12. Raised portions 46 accommodate positioning or orientation pins 52, 54 of module 50 that extend through corresponding positioning holes 16, 18 of headliner 12 when module 50 is installed. Positioning pins 52, 54 of a powered module 50 may include spring loaded conductors that contact corresponding raised portions 46 of conductors 40, 42 to provide power to module 50 after installation. Depending upon the particular application, conductors 40, 42 may be embedded in corresponding recesses in the upper or lower surface of center channel 26 of support beam 22 (see FIG. 4) to facilitate assembly. Of course, various other arrangements or positioning of conductors may be used to provide power to corresponding fixed or removable modules. For example, conductors 40, 42 may be positioned in a single one of outboard flanges 30, 32, or each flange 30, 32 may include a conductor.

Removable module 50 illustrated in FIG. 2 represents any of a number of modules that may be used in an overhead console system to provide general or specialized storage of personal items, control modules to control one or more interior or exterior accessories, or integrated accessories such as an audio, video, or computing device. Similarly, although a removable module is illustrated, permanent or semi-permanent modules may also be installed in the configurable system 10 of the present invention with the type of installation depending on the particular method used to secure the module to headliner 12 and support structure 20. Typical fixed or removable modules include fixed positioning pins 52, 54 in addition to a central attachment or latching device 56, which may be a rotatable latching device for removable modules (as illustrated). As described above, some modules 50 may include positioning pins having spring-loaded conductors to provide power to the module. For non-powered modules, positioning pins 52, 54 may comprise solid bosses molded into the top surface plate of module 50. Whether powered or non-powered, positioning pins 52, 54 are aligned with corresponding positioning apertures in headliner 12 and support structure 20 to provide rotational orientation of module 50 while latching device 56 is inserted into one of the attachment holes 14. For removable modules, latching device 56 is rotated to secure module 50 to support structure 20. Other latching devices or methods may be used for removable modules or panels (such as blank plate 60 described below) as well as permanent or semi-permanent installation of various modules. For example, threaded fasteners, rivets, glue, welding, and the like may be used to permanently or semi-permanently install various types of modules depending upon the particular application.

As shown in FIG. 3, system 10 includes a removable blank plate 60 having a fixed attachment device 62 with associated positioning pins 64, 66 that cooperate with a corresponding attachment hole 14 and positioning holes 16, 18 for areas of the support structure 20 where no module 50 is installed. Blank plate 60 operates to completely conceal support structure 20 from occupant view and provides an aesthetically pleasing appearance while having a minimum impact on head clearance and maintaining the configurability features of the present invention.

A cross-sectional view of a configurable overhead console system according to one embodiment of the present invention is shown in FIG. 4. Support member 22 is secured to roof bow 70 of the interior roof panel 72 at various points (or continuously) along the upper surface of outer channels 24, 28. Headliner 12 is secured to support member 22 using an adhesive or other appropriate fastening device along outboard flanges 30, 32 and optionally at selected points along the bottom surface of center channel 26. Recesses or tracks may extend along the bottom surface of center channel 26 to accommodate electrical conductors 40, 42 as described above. Alternatively, electrical conductors 40, 42 may be routed along the top surface of center channel 26, or along the top or bottom surfaces of flanges 30, 32, for example. Accessory, storage, or control module 50 is secured to support member 22 by latching mechanism 56, which extends through an attachment aperture 14 of headliner 12 and center channel 26 of support member 22.

FIG. 5 is a partial cut-away view of a representative attachment aperture 14 located in the bottom surface of central channel 26 of a support beam illustrating various features to facilitate installation of a removable overhead console module with a single rotatable latching device. During installation of a module having a rotatable latching device, the latching device extends through attachment aperture 14 and is turned clockwise (with respect to the occupant) to engage top surface 80 of the bottom of channel 26. The latching device then rests in an arcuate recessed area 82 against a raised positive stop 84, which prevents the latching device from disengaging channel 26 by over-rotation. In one preferred embodiment, positive stops 84 are positioned to limit rotation of a corresponding latching device to less than a single revolution and preferably about one-quarter turn or ninety degrees. The arrangement illustrated in FIG. 5 also accommodates modules that do not have rotatable latching devices, such as blank plate 60 (FIG. 3), for example. Positive stops 84 may also be used with an appropriately designed non-rotatable latching device to inhibit rotational movement of the installed module or blank plate.

A representative latching/locking device for an overhead module according to one embodiment of the present invention is shown in FIG. 6. Latching device 56 includes an upper portion 90 that passes through an aperture in module 50 and is joined to lower portion 92 using any suitable fastening method, such as an adhesive, vibration welding, or a screw, for example. Upper portion 90 includes a hollow post 94 connected to an elongate latching portion 96 that cooperates with a corresponding rectangular attachment aperture in the support structure as described above. Lower portion 92 includes a post 98 connected to flange 100 that may include a half-ring 102 and/or slot 104 to facilitate turning latching device 56 during installation or removal without requiring tools.

FIGS. 1–6 also illustrate a method for assembling a configurable overhead console system according to the present invention, the method including securing at least one console module to a support structure positioned above a headliner, the support structure and headliner having a plurality of attachment apertures with each attachment aperture having at least one associated positioning aperture that cooperates with at least one corresponding positioning pin of the console module. The method may also include securing at least one blank plate to the support structure via one of the attachment apertures. In one embodiment, a method according to the present invention includes securing a console module to the support structure using a single rotatable latching device that preferably locks with about one-quarter turn. The method may also include aligning diagonally positioned orientation pins with corresponding positioning apertures to rotationally orient the module. In addition, the method may include securing two electrical conductors to the support structure to deliver power to selected installed console modules and establishing an electrical connection between the electrical conductors and an installed console module via positioning pins of the console module that include integrated conductors that contact the electrical conductors of the support structure during installation of the module.

As such, the present invention includes a configurable overhead console system having a concealed support structure that maintains the integrity of the headliner by including attachment apertures rather than an elongated slot so the headliner is easier to handle and transport prior to attachment of the structural member. As illustrated and described in detail above, positioning of the support structure above the headliner provides numerous advantages relative to previous approaches.

While the best mode for carrying out the invention has been described in detail, those familiar with the art to which this invention relates will recognize various alternative designs and embodiments for practicing the invention as defined by the following claims.

What is claimed is:

1. A configurable overhead console for a vehicle, the overhead console comprising:

a headliner having a structural support member extending longitudinally above the headliner substantially concealed from a vehicle occupant and having a plurality of attachment apertures spaced along the support member, the headliner having a plurality of attachment apertures aligned with the attachment apertures the support member and adapted to receive corresponding modules positioned below the headliner each module supported by at least one fastener extending through the attachment apertures of the headliner and support member.

2. The configurable overhead console of claim 1 wherein the headliner further comprises at least one positioning aperture associated with each of the plurality of attachment apertures.

3. The configurable overhead console of claim 2 further comprising:

at least one module having at least one positioning pin that cooperates with the at least one positioning aperture and a latching device that cooperates with at least one of the attachment apertures of the headliner and structural support member to secure the module to the headliner.

4. The configurable overhead console of claim 3 wherein the latching device of the at least one module is rotatable to secure the module to the headliner and structural support member.

5. The configurable overhead console of claim 1 wherein the structural support member comprises a beam having three channels including two outboard channels and a central channel extending longitudinally above the headliner.

6. The configurable overhead console of claim 1 wherein the structural support member further comprises two diagonally positioned alignment apertures for each of the plurality of attachment apertures aligned with corresponding alignment apertures in the headliner.

7. The configurable overhead console of claim 6 further comprising an electrical conductor extending along each side of the plurality of attachment apertures and extending at least partially over the alignment apertures to engage alignment pins during installation of a powered module.

8. A configurable overhead console system comprising:

a headliner having a plurality of console module attachment holes spaced along a central axis to accommodate a plurality of console modules, the attachment holes being spaced several times the length of any one of the attachment holes to inhibit folding of the headliner along the central axis during handling and assembly of the headliner;

a support structure having a bottom surface secured to a top surface of the headliner to be substantially concealed from view of a vehicle occupant, the support structure including module attachment holes corresponding to the module attachment holes of the headliner and a top surface attachable to a vehicle roof; and a plurality of console modules each having a latching device that extends through the headliner and at least one corresponding attachment hole of the support structure to secure each console module to the support structure after installation.

9. The system of claim 8 wherein the console module includes a rotatable latching device that secures the console module to the support structure with less than one complete revolution of the latching device.

10. The system of claim 8 wherein the headliner and support structure include at least one positioning hole for each attachment hole to inhibit rotational movement of an installed console module.

11. The system of claim 8 further comprising a blank plate having a fixed attachment device for engaging and concealing at least one attachment hole where a console module is not installed.

12. The system of claim 8 further comprising an electrical conductor integrated with the support structure along each side of the attachment holes to distribute power to installed console modules.

13. A method for assembling a configurable overhead console system, the method comprising securing a plurality of console modules to a support structure positioned above a headliner, the support structure and headliner having a plurality of attachment apertures with each attachment aperture having associated diagonally positioned positioning holes that cooperate with corresponding positioning pins of the console module, wherein the step of securing the console module includes aligning the diagonally positioned alignment pins on the console module with corresponding diagonally positioned alignment holes in the support structure and inserting at least one fastening device associated with each module through the headliner to engage the support structure.

14. The method of claim 13 further comprising securing at least one blank plate to the support structure via one of the attachment apertures in a location where no console module is installed.

15. The method of claim 13 wherein the step of securing at least one console module to the support structure comprises securing a console module to the support structure using a single rotatable latching device.

16. The method of claim 13 wherein the step of securing at least one console module to the support structure comprises securing a console module to the support structure by rotating a latching device less than one complete revolution.

17. The method of claim 13 further comprising establishing an electrical connection to the console module by contacting electrical conductors embedded within the support structure with electrical contacts integrated with positioning pins of the console module during installation of the console module.

* * * * *